United States Patent
Eisner et al.

(10) Patent No.: US 7,872,944 B2
(45) Date of Patent: Jan. 18, 2011

(54) METHOD OF MONITORING MICROSEISMIC EVENTS

(75) Inventors: Leo Eisner, Cambridge (GB); Tomas Fischer, Praha (CZ)

(73) Assignee: Schlumberger Technology Corporation, Cambridge, MA (US)

( * ) Notice: Subject to any disclaimer, the term of this patent is extended or adjusted under 35 U.S.C. 154(b) by 742 days.

(21) Appl. No.: 11/832,410

(22) Filed: Aug. 1, 2007

(65) Prior Publication Data
US 2008/0151691 A1    Jun. 26, 2008

(30) Foreign Application Priority Data
Dec. 20, 2006    (GB) ................... 0625343.9

(51) Int. Cl.
*G01V 1/00*    (2006.01)
(52) U.S. Cl. .......................... 367/75; 702/14
(58) Field of Classification Search ............ 367/25, 367/31, 38, 75; 702/11, 14, 18
See application file for complete search history.

(56) References Cited

U.S. PATENT DOCUMENTS

| 5,917,160 A | 6/1999 | Bailey |
| 6,748,330 B2 * | 6/2004 | Leaney ................... 702/14 |

FOREIGN PATENT DOCUMENTS

| EP | 1324076 A2 | 7/2003 |
| GB | 2 379 505 A | 3/2003 |
| GB | 2387440 A | 10/2003 |
| WO | 03054587 A1 | 7/2003 |
| WO | 2006030310 A2 | 3/2006 |

OTHER PUBLICATIONS

Cerveny: "High-frequency elastic waves in smoothly Inhomogeneous media", Seismic Ray Theory, Cambridge University Press, 2001, pp. 57-59 and 62-63.
Maxwell et al: "Real-time microseismic mapping of hydraulic fractures in Carthage, Texas", 70th Annual International Meeting, SEG, Expanded Abstracts, 2000, pp. 1449-1452.
Moriya et al: "Precise source location of AE doublets by spectral matrix analysis of triaxial hodogram", Geophysics, vol. 59, No. 1, 1994, pp. 36-45.
Pearson: "The relationship between microseismicity and high pore pressures during hydraulic stimulation experiments in low permeability granitic rocks", Journal of Geophysical Research, vol. 86, No. B9, 1981, pp. 7855-7864.

(Continued)

*Primary Examiner*—Jack Keith
*Assistant Examiner*—Krystine Breier
(74) *Attorney, Agent, or Firm*—Vincent Loccisano; James McAleenan; Brigid Laffey

(57) ABSTRACT

A microseismic method of monitoring fracturing operation or other passive seismic events in hydrocarbon wells is described using the steps of obtaining multi-component s-wave signals of the event; and using a linear derivative of S-wave arrival times of the signals in a first direction, an S-wave velocity and an s-wave polarization to determine at least two components of the S-wave slowness vector.

11 Claims, 4 Drawing Sheets

OTHER PUBLICATIONS

Phillips et al: "Induced microearthquake patterns and oil-producing fracture systems in the Austin chalk", Tectonophysics, vol. 289, 1998, pp. 153-169.

Rutledge et al: "Hydraulic stimulation of natural fractures as revealed by induced microearthquakes, Carthage Cotton Valley gas field, east Texas", Geophysics, vol. 68, No. 2, 2003, pp. 441-452.

Sun et al: "2-D wavepath migration", Geophysics, vol. 66, No. 5, 2001, pp.. 1528-1537.

Vanelle et al: "Application of sectorially best-fitting isotropic background media", SEG International Exposition and 74th Annual Meeting, Denver, Colorado, Oct. 10-15, 2004.

Zheng et al: "Local determination of weak anisotropy parameters from qP-wave slowness and particle motion measurements", Pure appl. gephys., vol. 159, 2002, pp. 1881-1905.

Rumpker et al, "A maslov-propagator seismogram for weakly anisotropic media", Geophysical Journal International, vol. 150-, 2002, pp. 23-36.

* cited by examiner

FIG. 4A
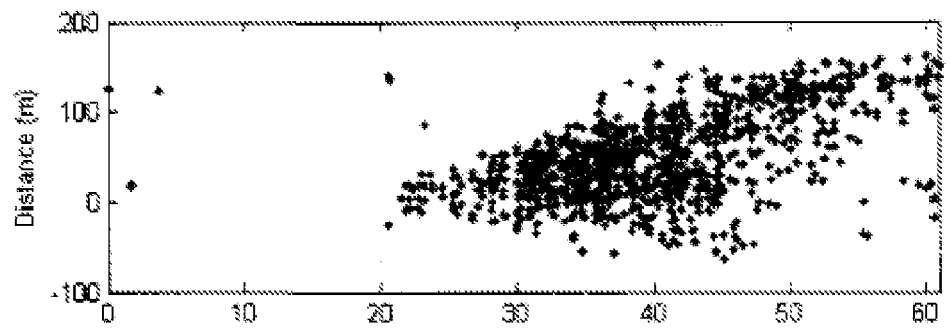
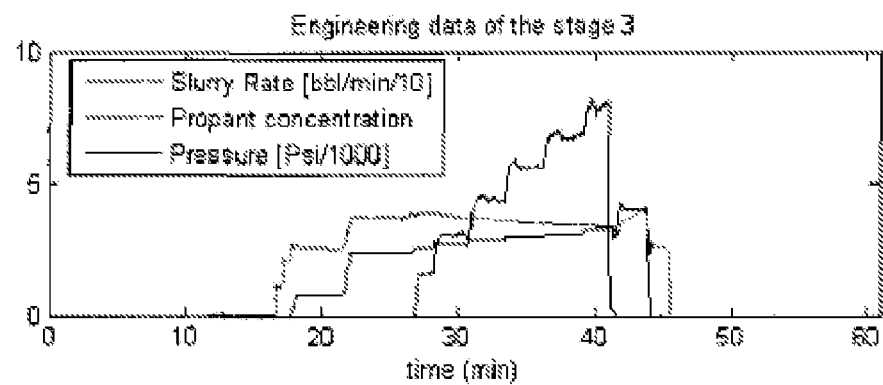
FIG. 4B
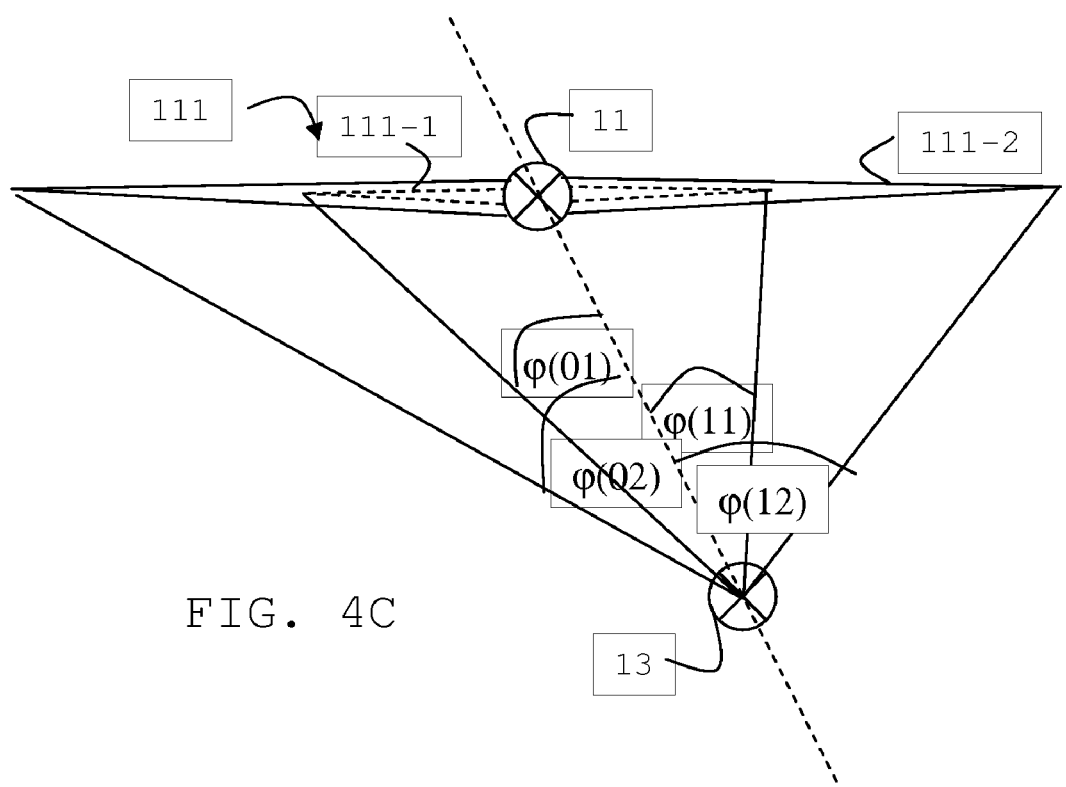
FIG. 4C

METHOD OF MONITORING MICROSEISMIC EVENTS

This invention relates to methods for acquiring seismic data, particularly passively monitoring seismic events. Such monitoring may be applied to hydrocarbon reservoirs, subterranean water-bearing layers or storage sites for carbon dioxide and waste. It also relates to monitoring hydraulic stimulation such as fracturing rock layers with subterranean locations. More specifically it relates to such methods using seismic methods to determine the location of microseismic events or operations.

BACKGROUND OF THE INVENTION

Seismic monitoring is known as a method with an observation horizon that penetrates far deeper into a hydrocarbon reservoir than any other method employed in the oilfield industry. It has been proposed to exploit the reach of seismic methods for the purpose of reservoir monitoring.

In conventional seismic monitoring a seismic source, such as airguns, vibrators or explosives are activated and generate sufficient acoustic energy to penetrate the earth. Reflected or refracted parts of this energy are then recorded by seismic receivers such as hydrophones and geophones.

In passive seismic monitoring there is no actively controlled and triggered source. The seismic energy is generated through so-called induced microseismic events caused by human activity or intervention.

Apart from the problem of detecting the often faint microseismic events, their interpretation is difficult as neither the source location nor the source signature or characteristics are known a priori. However knowledge of these parameters is essential to deduce further reservoir parameters knowledge of which would improve reservoir control.

A specific field within the area of passive seismic monitoring is the monitoring of hydraulic fracturing. To improve production or where reservoirs are used for storage purposes workers in the oil and gas industry perform a procedure known as hydraulic fracturing. For example, in formations where oil or gas cannot be easily or economically extracted from the earth, a hydraulic fracturing operation is commonly performed. Such a hydraulic fracturing operation includes pumping large amounts of fluid to induce cracks in the earth, thereby creating pathways via which the oil and gas may flow. After a crack is generated, sand or some other material is commonly added to the crack, so that when the earth closes back up after the pressure is released, the sand helps to keep the crack open. The sand then provides a conductive pathway for the oil and gas to flow from the newly formed fracture.

However, the hydraulic fracturing process is difficult to monitor and control. The hydraulic fractures cannot be readily observed, since they are typically thousands of feet below the surface of the earth. Therefore, members of the oil and gas industry have sought diagnostic methods to tell where the fractures are, how big the fractures are, how far they go and how high they grow. Thus, a diagnostic apparatus and method for measuring the hydraulic fracture and the rock deformation around the fracture is needed.

In previous attempts to solve this problem, certain methods have been developed for mapping fractures. For example, one of these methods involves seismic sensing. In such a seismic sensing operation, micro-earthquakes generated by the fracturing are analyzed by seismic meters, for example, accelerometers.

Known method of microseismic event location from a single vertical monitoring array used for example in the field of hydraulic fracturing monitoring (HFM) include the detection of arrivals of P- and S-waves, thus constraining the event depth and distance from the monitoring array. The polarization of the P waves is then used to determine the vertical plane in which the source is located. The vertical plane is often reduced to a single direction known as azimuth of the source or back-azimuth of the source. The microseismic events are then located with the back-azimuth derived from P waves; distance and depth are constrained by the timing of arrivals of P- and S-waves.

Details of these method can be found for example in the following publications:

Maxwell S. C., Urbancic T. I., Falls S. D., Zinno R.: "Real-time microseismic mapping of hydraulic fractures in Carthage", Texas, 70th Annual International Meeting, SEG, Expanded Abstracts, 1449-1452 (2000).

Moriya, H., K. Nagano and H. Niitsuma: "Precise source location of AE doublets by spectral matrix analysis of the triaxial hodogram", Geophysics, 59, 36-45 (1994).

Pearson, C: "The relationship between microseismicity and high pore pressures during hydraulic stimulation experiments in low permeability granitic rocks", Journ. Of Geophys Res. 86 (B9), 7855-7864 (1981).

Phillips W. S., T. D. Fairbanks, J. T. Rutledge, D. W. Anderson: Induced microearthquake patterns and oil-producing fracture systems in the Austin chalk. Tectonophysics, 289, pp. 153-169 (1998).

However the P-wave amplitudes are typically much smaller than the S-wave amplitudes of the same event. Hence, the number of events that can be located is low compared to the number detected. The radiation pattern of a source contributes further to the difficulty of determining the location of the event. It is for example possible for a linear array of receivers to be located in the vicinity of the P-wave nodal line. In such case the amount of energy detected and associated with the p-wave emission of an event tends to be very small, making the detection of the P-wave polarization a difficult task.

A more recent study on the use of microseismic imaging for fracture stimulation was published as:

Rutledge, J. T. and Phillips, W. S. (2003): Hydraulic stimulation of natural fractures as revealed by induced microearthquakes, Carthage Cotton Valley gas field, east Texas. Geophysics, 68, 441-452.

In the publication, the authors measure the horizontal particle polarization of the S-waves signals and determine the direction perpendicular to the particle polarization as the back-azimuth of the source. This approach can be seen as an approximation, as the polarization direction of the S-wave may be oriented in any orientation in the plane perpendicular to the slowness vector of S-wave.

In Zheng X., I. Psencik (2002): Local determination of weak anisotropy parameters from qP-wave slowness and particle motion measurements. Pure Appl. Geophys., 159, 1881-1905, there are described methods of determining local anisotropy from known source locations with general S-wave polarization.

The present invention seeks to improve the methods for determining the back-azimuth or the full S-wave slowness vector of passive seismic events or sources, seismic events, or, more specifically, the fracture location or propagation in a hydrocarbon reservoir.

SUMMARY OF THE INVENTION

The invention describes a method of processing passive seismic events including using an array of sensors and estimating the slowness component of the S-wave along an array axis and combining this with the knowledge of the actual S-wave velocity of the medium and perpendicularity of the S-wave polarization to the slowness to determine the back-azimuth or any related parameter.

In a preferred embodiment, the method includes the step of determining the full S-wave slowness vector of the microseismic event.

The S-wave velocity in the vicinity of a receiver is usually a well-known or at least readily accessible measurement. In a wellbore this velocity value can be for example established from sonic log measurements as are standard in the industry.

The method is advantageously applied during fracturing operations in a wellbore or several wellbores.

The array of seismic sensors receivers includes any arrangement of receiver capable of capturing polarization of an S-wave, such as multi-component geophones or accelerometers. The arrangement is sufficiently dense to allow for the calculation of a travel time derivative along a desired axis. At a minimum the array is a linear array. The sensors can be located at the surface or within a wellbore.

In a further aspect of the invention the above method is used to determine the propagation speed of a fracture by monitoring the temporal changes of the back-azimuth, preferably without prior knowledge of the exact 3D coordinates of the microseismic events tracked.

These and further aspects of the invention are described in detail in the following examples and accompanying drawings.

BRIEF DESCRIPTION OF THE DRAWINGS

The invention will now be described, by way of example only, with reference to the accompanying drawings, of which:

FIGS. 4 A, B and C illustrate the application of the present method to determine the fracture velocity during a fracturing operation.

DETAILED DESCRIPTION

Figure 1:
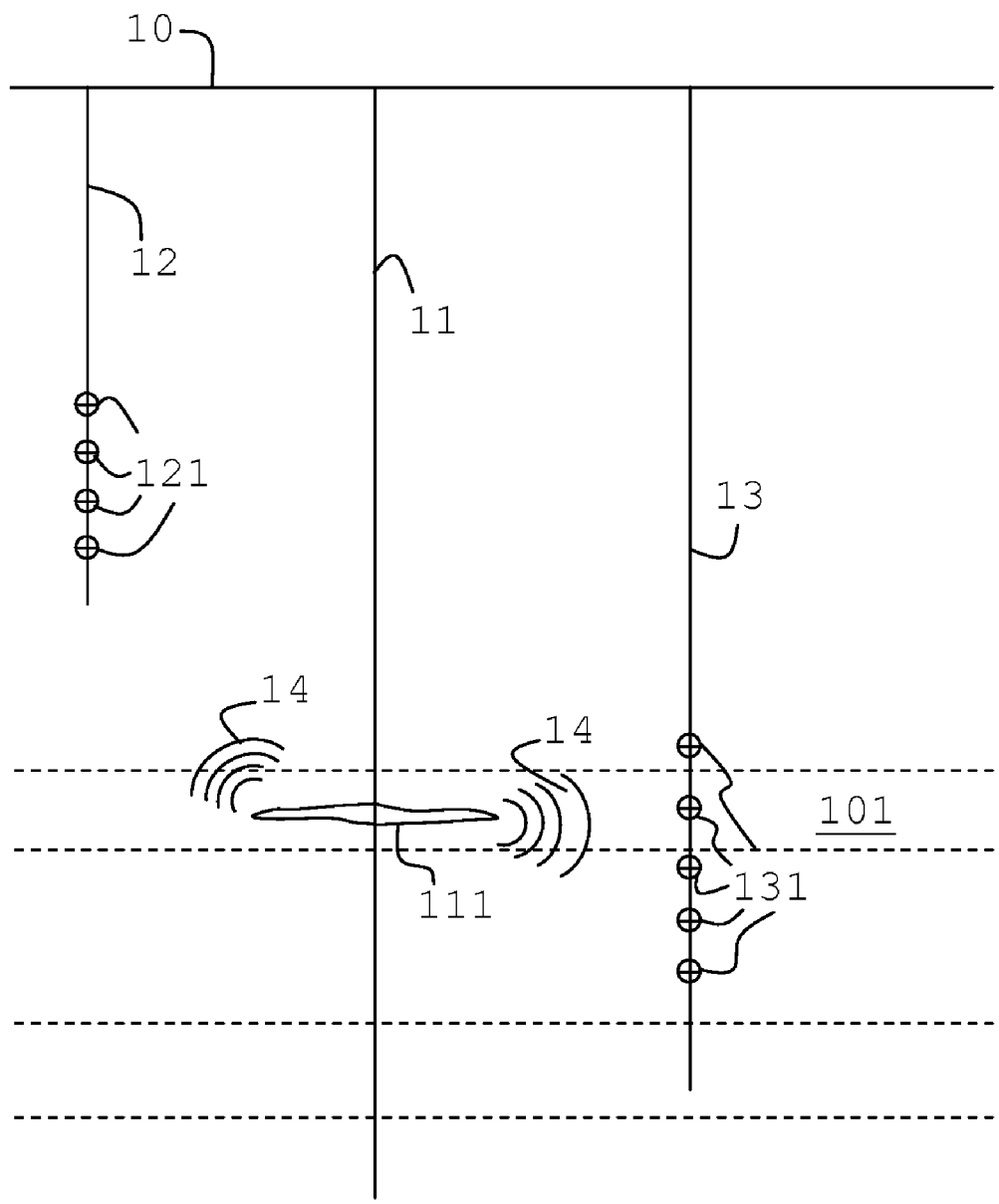
FIG. 1 shows a schematic illustration of a fracturing operation.

A typical operational setting for monitoring hydraulic fracturing is illustrated in FIG. 1 with a treatment well 11 and geophone arrays 121, 131 located in neighboring wells or holes 12, 13. During the fracturing operation a fluid is pumped from the surface 10 into the treatment well 11 causing the surrounding formation in a hydrocarbon bearing layer 101 to fracture. S-waves 14 generated by the fracture 111 propagate through the earth and are recorded by the three-components geophones of the two arrays 121, 131 in the monitoring wells 12, 13.

For the present invention it is assumed that three components of the time history of particle velocity (or particle displacement or acceleration) at several downhole or surface receivers are recorded for an acoustic emission and include at least the S-wave arrivals at all of those receivers.

The slowness vector $\vec{p}$ of the detected S-wave is determined from the S-wave arrival-times $T_S(z)$, where z is a coordinate along the linear array (e.g., the depth in case of a vertical borehole), from linear particle polarization $\vec{e}$ of the S-wave and from S-wave velocity along the borehole $v_S(z)$.

Figure 2:
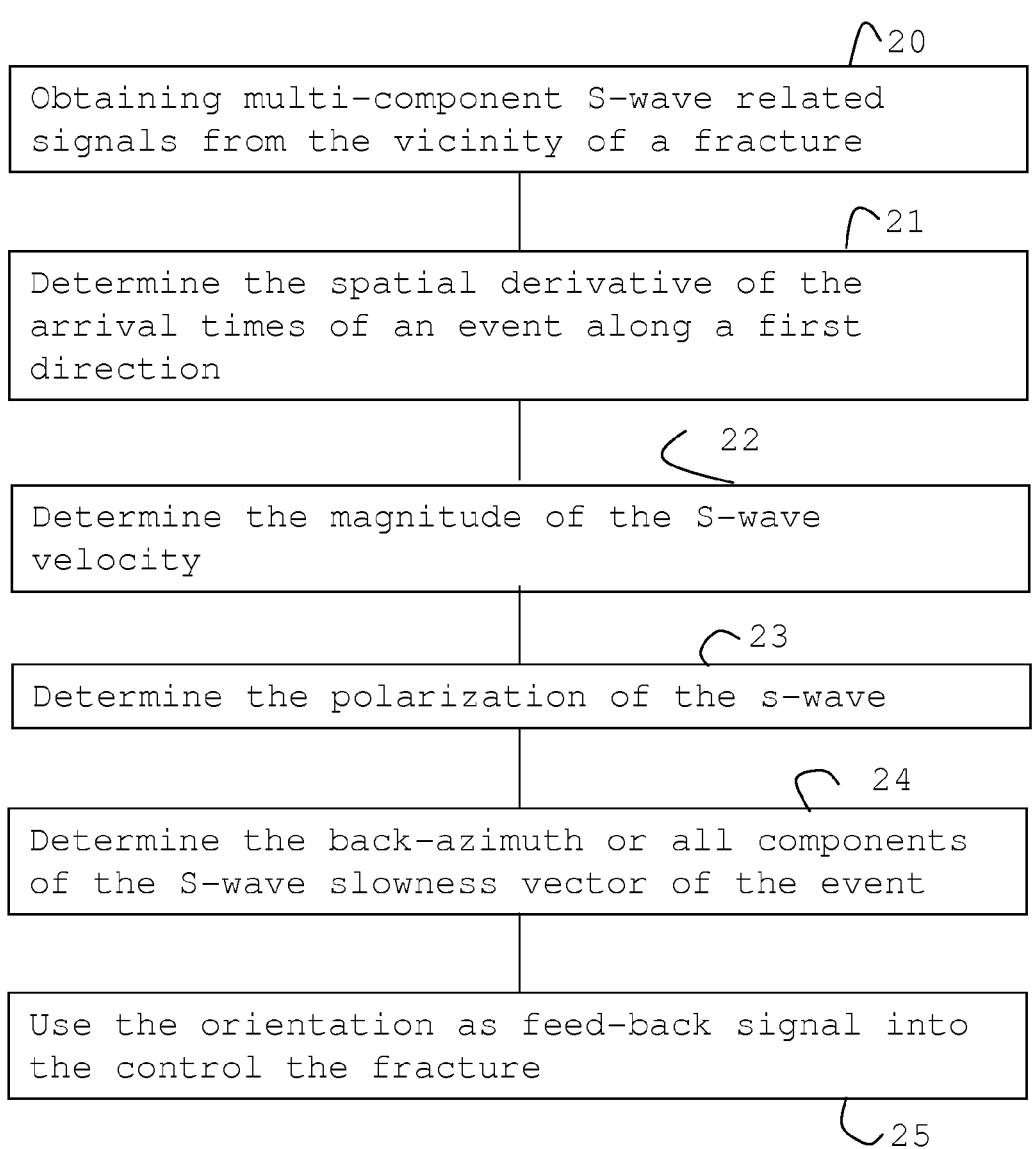
FIG. 2 is a flowchart of steps performed in an example of the present invention.
Figure 3:
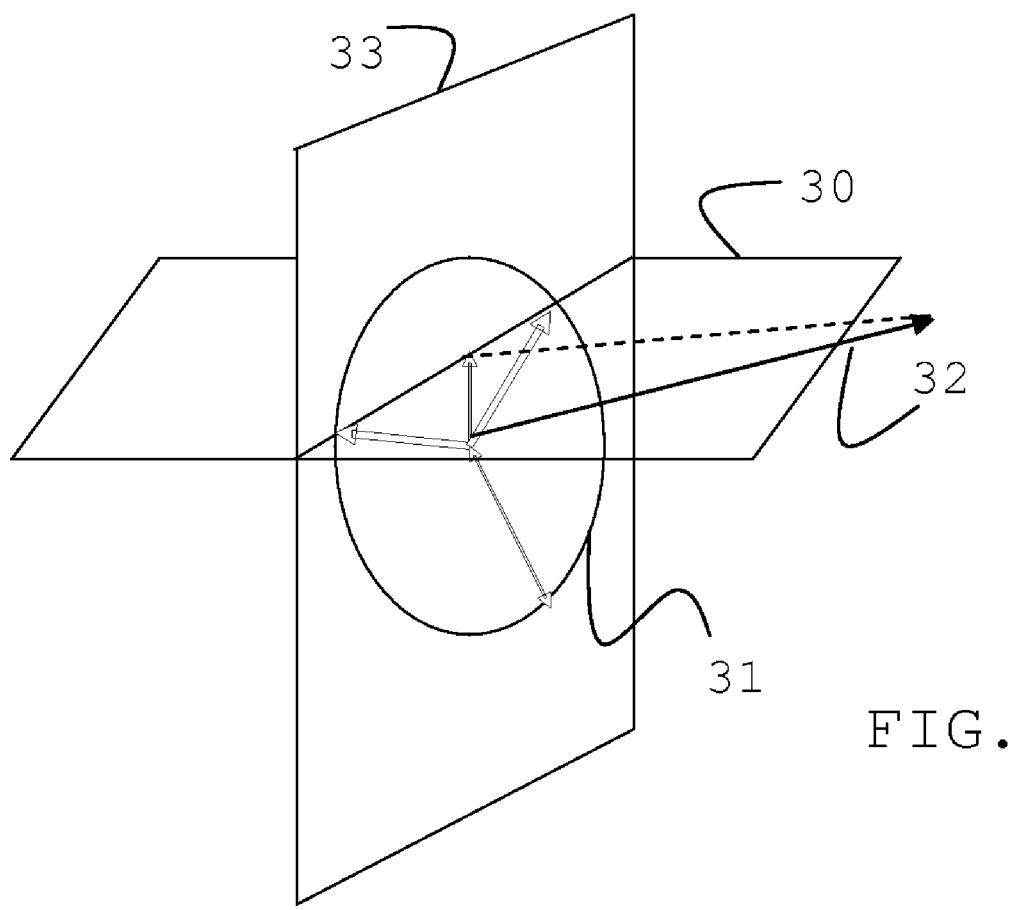
FIG. 3 illustrates the respective orientations of an s-wave in accordance with an example of the invention.

The steps as outlined in FIG. 2 together with the diagram of FIG. 3 illustrate how the components are defined and used.

After acquiring multi-component S-wave signals (Step 20 of FIG. 2) using receiver arrays such as illustrated in FIG. 1, the derivative of the S-wave arrival-time with respect to the borehole coordinate is determined (Step 21) is the projection $p_z$ of the slowness vector along the line of receivers. In the case of FIG. 1 this line is identical with depth.

$$p_z(z) = dTs(z)/dz, \quad [1]$$

where Ts(z) denote the arrival time of an event along the direction z of the array. This defines a plane 30 of a constant vertical component of the slowness vector as shown in FIG. 3.

Furthermore, the slowness vector in smoothly varying medium must satisfy the eikonal equation (circle 31 in FIG. 3):

$$p_z(z) \cdot p_z(z) + p_y(z) \cdot p_y(z) + p_x(z) \cdot p_x(z) = 1/v_S^2(z). \quad [2]$$

This equation is valid for isotropic medium; for an anisotropic medium a generalized eikonal equation is necessary. Such generalized eikonal equation are known per se and can be found for example in Červený V., "Seismic Ray Theory", Cambridge University Press., 63 or 149 (equation 2.3.46) (2001).

In addition to $V_S^2$ which is usually known from measurements such as sonic well logs or equivalent measurements (Step 22), at least in isotropic medium the S-wave polarization $\vec{e}$ is perpendicular to the slowness vector 32 as illustrated by plane 33 in FIG. 3):

$$p_z(z) \cdot e_z(z) + p_y(z) \cdot e_y(z) + p_x(z) \cdot e_x(z) = 0. \quad [3]$$

Thus, for each z where the S-wave polarization (Step 23), the S-wave velocity 22 and derivative of the arrival time 21 is measured, it is possible to define the above three equations (No. 1-3) for three unknown components of the slowness vector. Given these equations all components $p_x$, $p_y$, $p_z$ of the S-wave slowness vector can be determined using various methods. It should be noted that the back azimuth is already determined by knowledge of the two components $p_x$ and $p_y$ of the slowness vector.

One exemplary method of solving the system of equations (1-3 is to substitute for x component of the slowness $$p_x(z) = \frac{-p_z e_z - p_y e_y}{e_x}, \quad [4]$$

and to find two solutions for the slowness vector:

$$p_y(z) = \frac{-b \pm \sqrt{b^2 - 4ac}}{2a}, \quad [5]$$

where $$a = 1 - e_z^2,$$

$$b = 2e_y e_z p_z, \quad [6]$$

$$c = p_z^2(1 - e_y^2) - e_x^2/v_S^2(z).$$

Particular attention may be given to the cases where the S-wave is polarized in a plane perpendicular to the x direction (i.e., $e_x=0$), when the $p_x$ can be determined directly from equation (2). It should be noted that this technique may fail if the S-wave is polarized along the borehole (i.e., $e_z=1$, $a=0$).

The above system of equations has hence two solutions for slowness vector orientation.

From these two possible vectors, the slowness vector chosen is the one which points away from the expected source location. Alternatively, both solutions can be used and tested for convergence to a single hypocenter using the slowness vectors as determined using all receivers across the array.

As discussed already above, the ratio of horizontal components $p_x$ and $p_y$ of the selected vector determines the back-azimuth $\phi(z)$:

$$\varphi(z) = \operatorname{arctg}\frac{p_x(z)}{p_y(z)} \quad [7]$$

It is well within the ambit of the ordinary skilled person to use ways other that that described above of solving the system of the three equations (1-3) for the three unknowns.

It was further found that the back azimuth itself can be used to determine the velocity with which a fracture spreads during the fracturing operation.

In FIG. 4A, there is shown the distribution of microseismic events along a certain direction relative to the treatment wellbore at position 0 and in dependence of time. These events are caused by a fracturing operation. The corresponding time profiles of some parameters (Slurry rate, proppant concentration, pressure) of the fracturing operations are shown in FIG. 4B.

Taking where applicable the same numerals as in FIG. 1, FIG. 4C shows the growth of a fracture 111 in the treatment well 11 from location 111-1 to 111-2. By monitoring the envelope of the events using the 3C-geophones in the monitoring well 13 and the novel method, the angles $\phi(01)$ to $\phi(12)$ can be determined. It has been recognized that the envelope the events can be identified as the (moving) tip of a fracture and, hence, the angles $\phi(01)$ to $\phi(12)$ used to determine its extent and speed of propagation.

The general orientation of the fracture, if not known is usually determinable from other set of measurement, for example from the orientation of the principal stresses at the wellbore, or from previous evaluation of the locations of microseismic events. Given the general orientation of the fracture and the azimuth of the events which define the envelope, the fracture propagating speed can be determined. It should be noted that this determination does not require the intermediate step of evaluating the signals for the exact spatial location of the events in three dimensions. The method the temporal change of the orientation of the S-wave slowness vector to monitor the fracture without necessarily making use of the exact location of the events.

The invention claimed is:

1. A method of monitoring a subterranean reservoir to determine location of one or more passive seismic events comprising the steps of obtaining multi-component S-wave signals of a passive seismic event at an array of seismic receivers; and using a linear derivative of S-wave arrival times of the signals in one direction, an S-wave velocity and an S-wave polarization to determine at least two components of the S-wave slowness vector.

2. The method of claim 1 including the step of determining the back azimuth of a location of a passive seismic event.

3. The method of claim 1 including the step of determining three components of the S-wave slowness vector.

4. The method of claim 1 wherein the event is caused by a fracturing operation in a wellbore.

5. The method of claim 1 wherein the derivative is determined along the direction of a linear array of seismic receivers.

6. The method of claim 5 wherein the receivers are located within a borehole.

7. The method of claim 5 wherein the receivers are located at the surface.

8. The method of claim 1 wherein derivative is determined along the direction of a linear array of seismic receivers placed within the borehole used for the fracturing operation.

9. The method of claim 2 including the step of using the orientation as part of the control of the fracturing operation.

10. The method of claim 1, further comprising the step of measuring the back azimuth as a function of time to determine the speed at which a fracture propagates away from a wellbore and/or the distance of the tip of the fracture from the wellbore.

11. The method of claim 10, where the step of determining the speed at which a fracture propagates away from a wellbore and/or the distance of the tip of the fracture from the wellbore is performed independent of or prior to a localization of events.

* * * * *